May 10, 1932.　　F. C. CAMERON　　1,857,939

ARTIFICIAL FISH BAIT

Filed Dec. 30, 1929

INVENTOR
Frederick C. Cameron,
BY
ATTORNEYS

Patented May 10, 1932

1,857,939

UNITED STATES PATENT OFFICE

FREDERICK C. CAMERON, OF LUMBERTON, NORTH CAROLINA

ARTIFICIAL FISH BAIT

Application filed December 30, 1929. Serial No. 417,375.

This invention relates in general to artificial bait of the type which is a simulation or imitation of small fish, one object of the invention being to provide artificial bait of this character embodying novel and improved features of construction whereby the bait can be caused to move in the water in close simulation to the natural movements of the fish it represents and assume positions like those of such fish, so that the bait shall be an attractive lure to the fish being angled for and an effective aid to the angler.

Another object is to provide such an artificial bait which has a novel and improved configuration whereby the bait can be caused to move with a scooting action or in curved paths and the direction of movement quickly reversed.

Another object is to provide an artificial bait of this character embodying novel and improved features of construction whereby the bait can be manipulated and held by the angler in an inclined position with respect to the surface of the water to closely simulate a fish feeding at the surface.

Other objects are to provide such a bait so constructed that it can be caused to dive downwardly away from the surface like a diving natural fish; to provide a bait of this character having a buoyant waterproof body and movable weights thereon to tilt the body head upward or head downward as desired by the angler to simulate a feeding position or diving action and to cause the bait to clear the water upon "reeling in" in simulation of a fish leaping and springing; to provide such a bait which shall be simple and inexpensive, and to obtain other advantages and results as will be brought out by the following description.

Referring to the accompanying drawings in which corresponding and like parts are designated by the same reference characters throughout the several views, Figure 1 is a side elevation of an artificial bait embodying my invention showing the manner of manipulating the bait in water.

Figure 1:
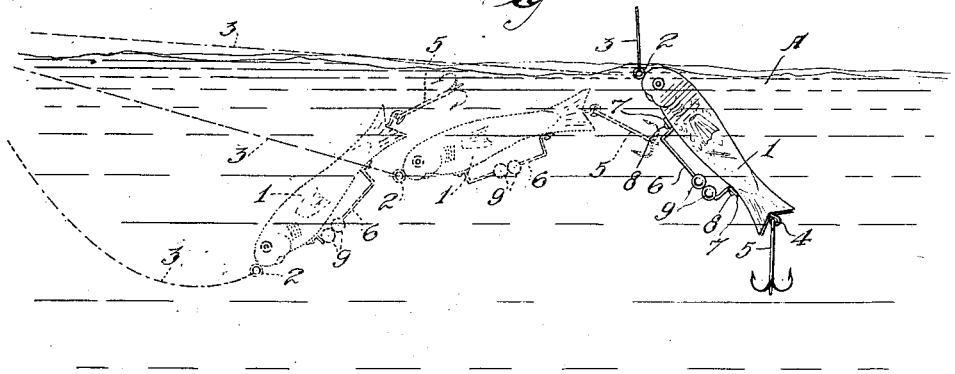
Figure 2:
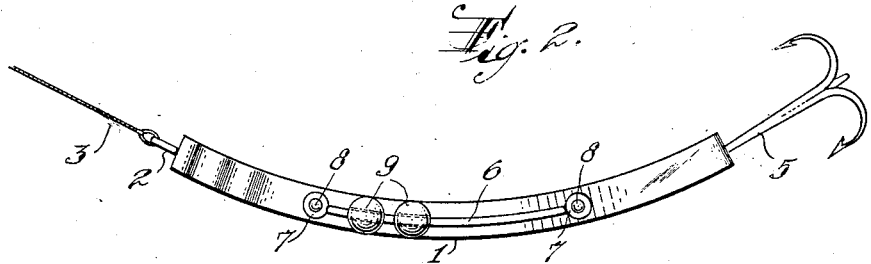
Figure 2 is a bottom plan view of the bait.
Figure 3:
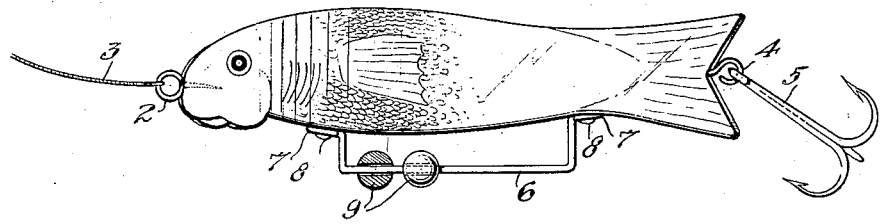
Figure 3 is a side elevation of the bait with portions broken away and shown in section.

Specifically describing the invention, the bait consists of an elongated body 1 which is longitudinally curved, preferably arcuately, and it is desirable that the length of the body be approximately equal to a sixty degree arc of a four inch circle. The most satisfactory cross-sectional shape for the body 1 is oblong rectangular, and the body having longitudinally curved smooth vertical sides and being of uniform transverse section as shown, has been found to be more satisfactory than a bait having a body of irregular cross section. It is also desirable that the bait be water-proofed, and this may be accomplished by forming the bait of wood or other suitable material and covering it with a water-proof coating known to those skilled in the art, for example, celluloid.

The bait is made in simulation of a small fish, and at the head end of the bait is provided an eye or other suitable means 2 for attaching the bait to a line 3. At the tail end of the bait is secured by an eye 4 a hook 5, preferably of the three-barb type.

In use the bait is pulled through the water by tension on the line 3, and the longitudinally curved shape of the body causes the bait to move with a scooting action or in curved paths; and by proper manipulation of the line the direction of movement of the bait can be quickly reversed, so that the swimming movements of the small fish represented by the bait are closely simulated.

In accordance with another feature of the invention, the body 1 is made buoyant, and a weight is provided for causing the body to tilt at an inclination to the surface of the water so that the bait may assume a position with the head uppermost, as when a fish is feeding, or with the head downward, as when a fish dives or swims away from the surface. As shown on the drawings the bottom longitudinal edge of the body has secured thereto a wire 6 the main portion of which is spaced and substantially parallel to the edge of the body and the ends of which are looped at 7 and secured to the body 1 by screws or other suitable means 8. Slidable upon the rod are two spherical weights 9 which are freely movable by action of gravity along the rod, longitudinally of the body. Instead of two weights I may utilize one or more as may be desirable. In many instances one large weight is more satisfactory than two small weights as shown. The wire 6 and the weights 9 are preferably formed of chromium plated monel metal so as to effectively withstand alternate wetting and drying incident to use of the bait, without rusting or corroding.

When the bait is in use and tension substantially vertically is maintained on the line 3, the weights 9 slide by action of gravity toward the tail end of the body so as to tilt the body at an inclination to the surface A of the water, as shown by solid lines in Figure 1. In this position the bait simulates a feeding fish. By a proper quick jerk upon the line downwardly and in substantially a longitudinal plane of the body, the head end of the body is caused to tilt downwardly whereupon the weights 9 slide toward the head end of the body and cause the weight to tilt with the head end downwardly, as shown by dotted lines in Figure 1. The bait thus simulates a diving fish. This action or function of the bait in connection with the scooting action resulting from the longitudinal curvature of the bait, enables the angler to cause the bait to closely simulate all natural movements of a small fish in the water. Also, the weights in combination with the buoyant body cause the bait to clear the water or rise from the surface thereof upon reeling in of the line, with a leaping or springing action which closely simulates the leaping of a fish from the water.

While I have shown and described the invention as embodied in certain details of construction, it should be understood that this is primarily for the purpose of illustrating the principles of the invention and that the details of construction of the bait may be modified and changed by those skilled in the art without departing from the spirit or scope of the invention.

Having thus described my invention, what I claim is:

1. An artificial bait comprising a body of buoyant material having longitudinally arcuately curved parallel sides and a weight mounted on the bottom edge of said body for movement longitudinally thereof to tilt said body with one end or the other upward according to the position of the weight.

2. An artificial bait comprising a buoyant body having longitudinally arcuately curved parallel sides, and a weight slidably mounted on the bottom edge of said body for movement by gravity longitudinally of the body to tilt the body with one end or the other upward according to the position of the weight.

3. An artificial bait comprising a body of buoyant material having longitudinally arcuately curved parallel sides and being oblong rectangular in cross section, and formed at one end for attachment to a line, a wire having its ends secured to the bottom edge of said body and the main portion in spaced and parallel relation to the body, and a weight slidable on said wire by action of gravity.

4. An artificial bait comprising a body approximately oblong rectangular in cross section, said body having longitudinally arcuately curved substantially parallel sides and means at its front end for attachment of a line, and a weight slidably mounted for gravitational movement longitudinally of the body to influence said body into a position in water with said sides substantially vertically disposed and to cause said body to tilt longitudinally in a vertical plane according to the position of the weight.

FREDERICK C. CAMERON.